UNITED STATES PATENT OFFICE.

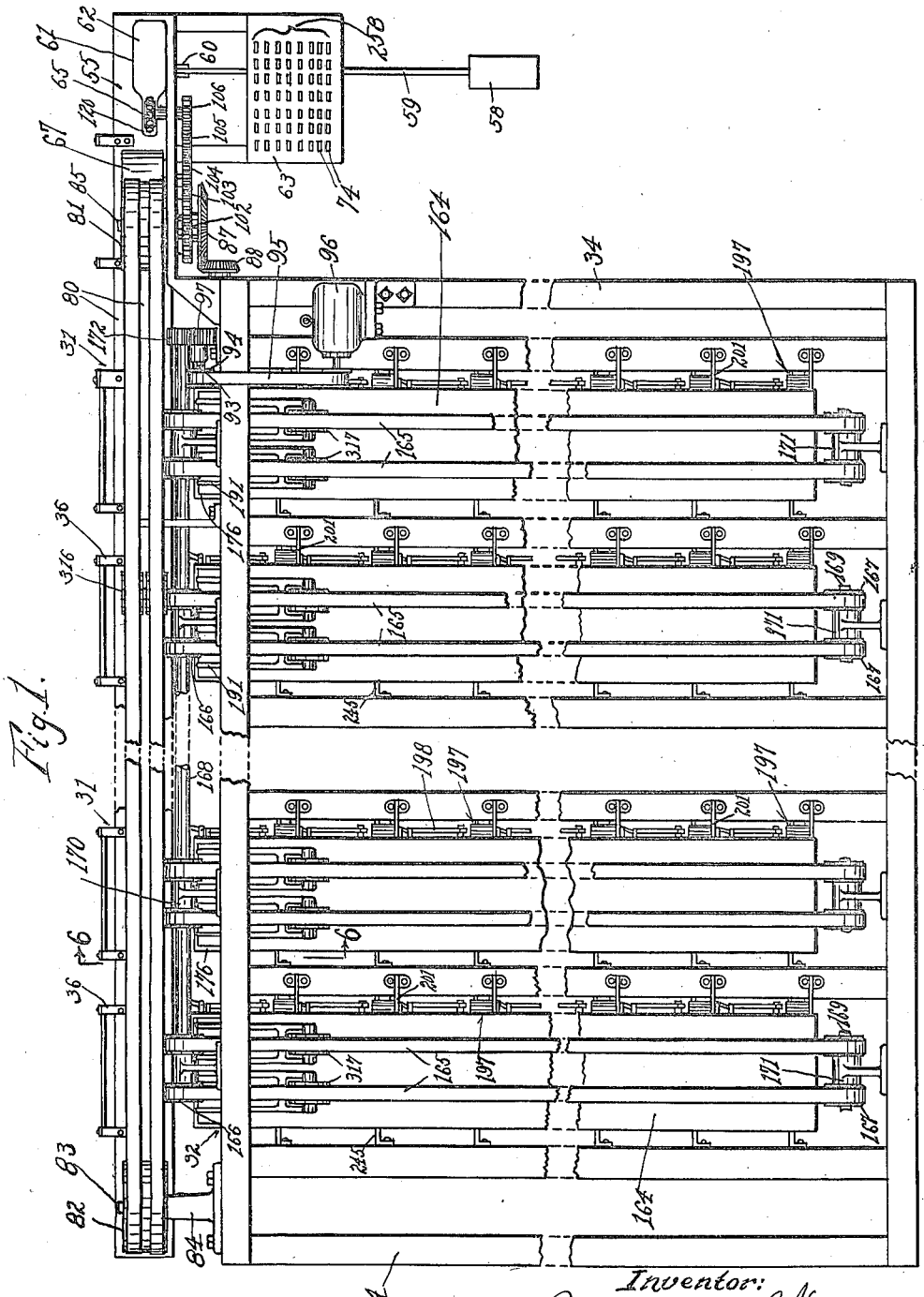

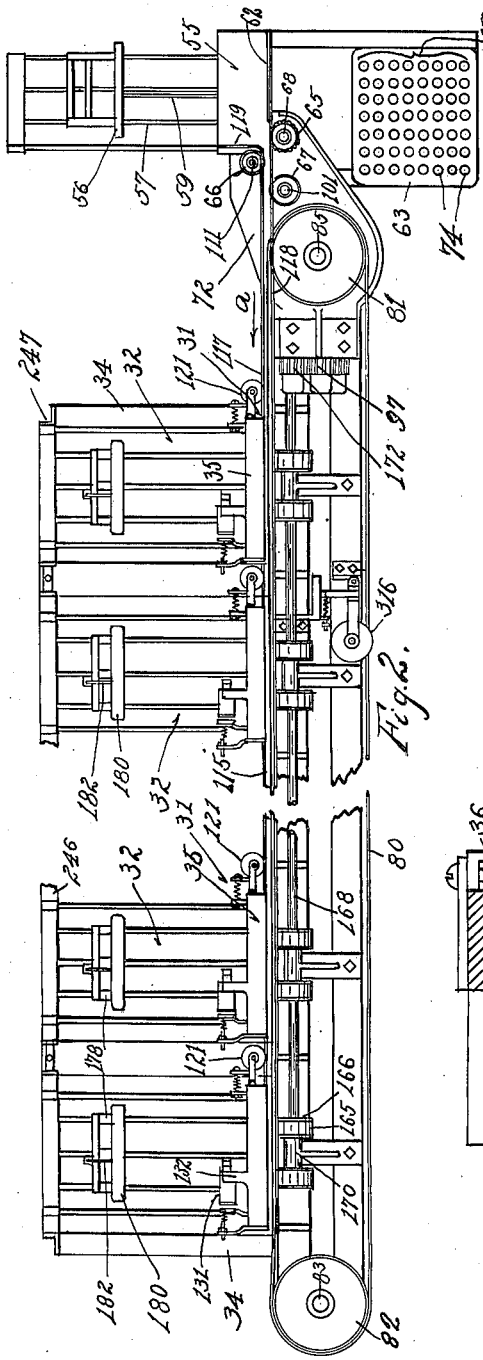

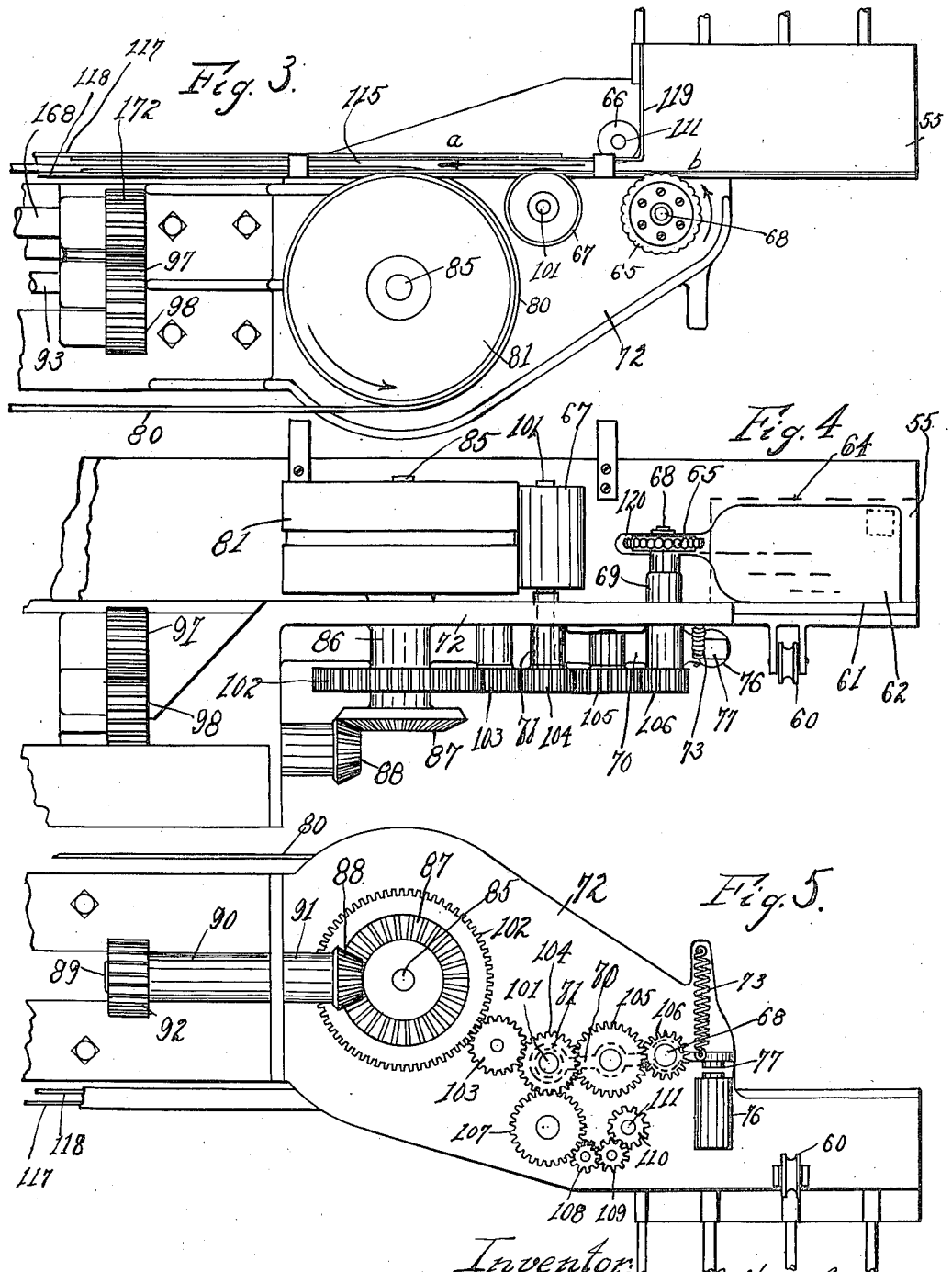

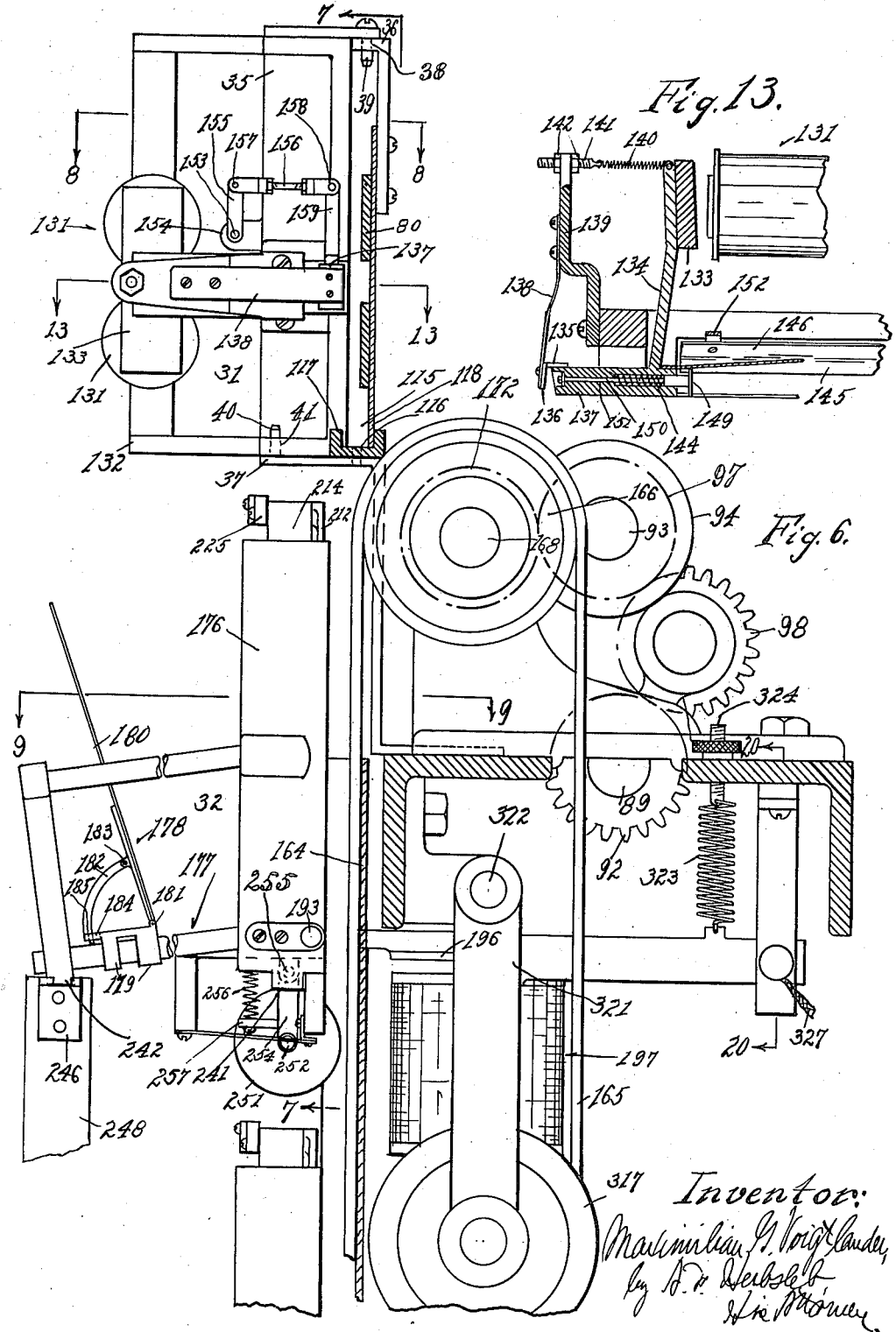

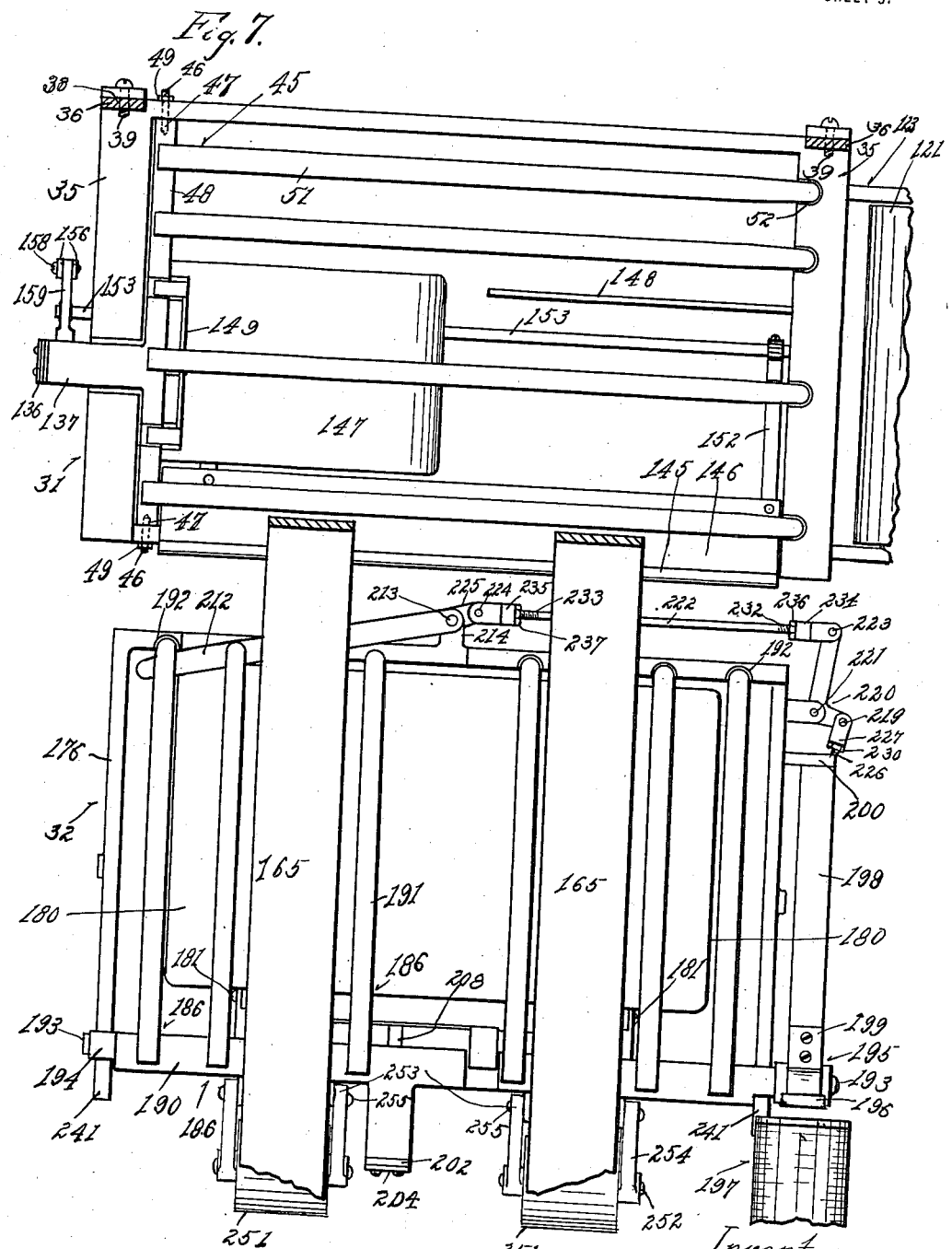

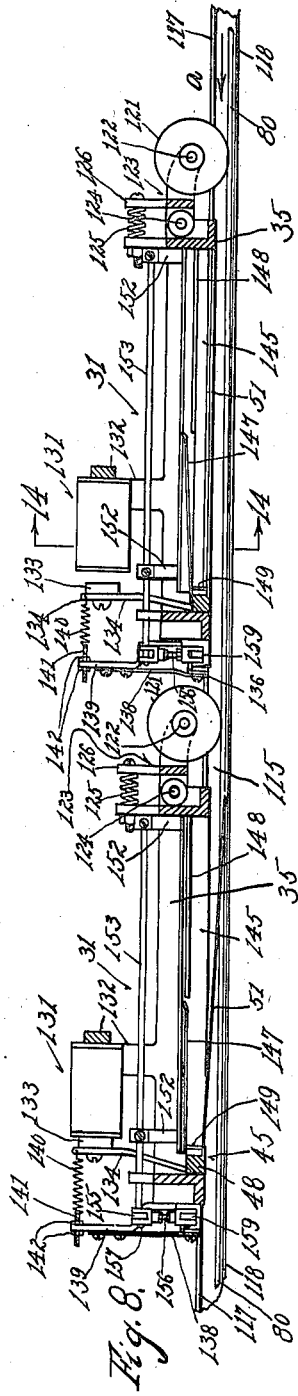
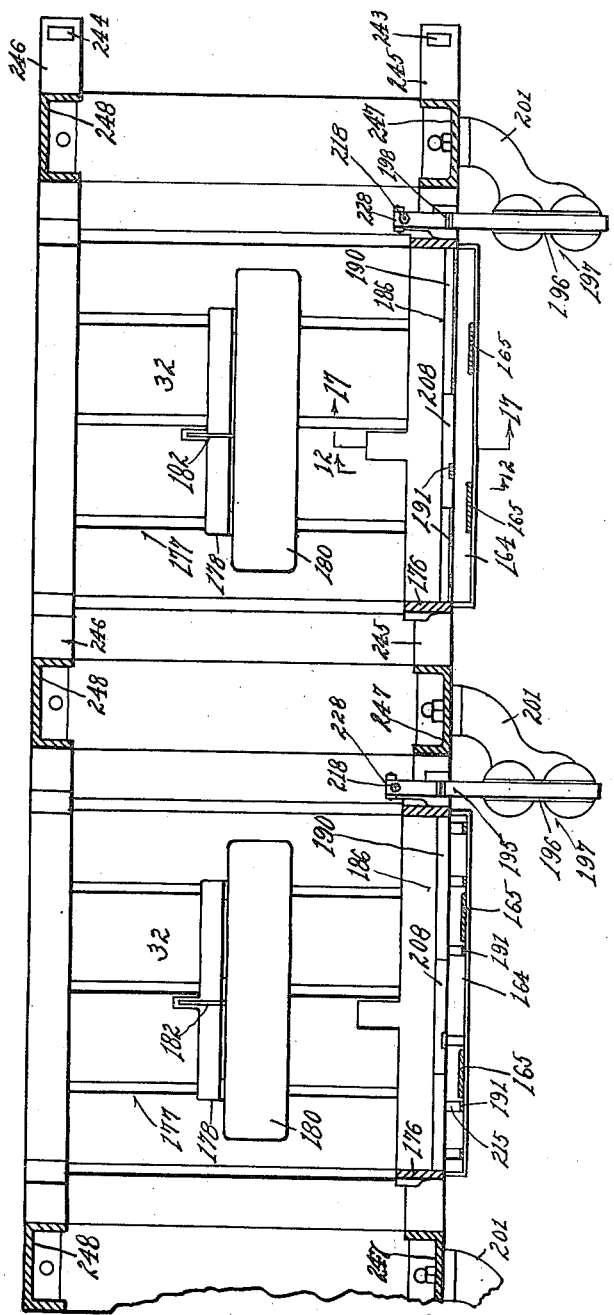

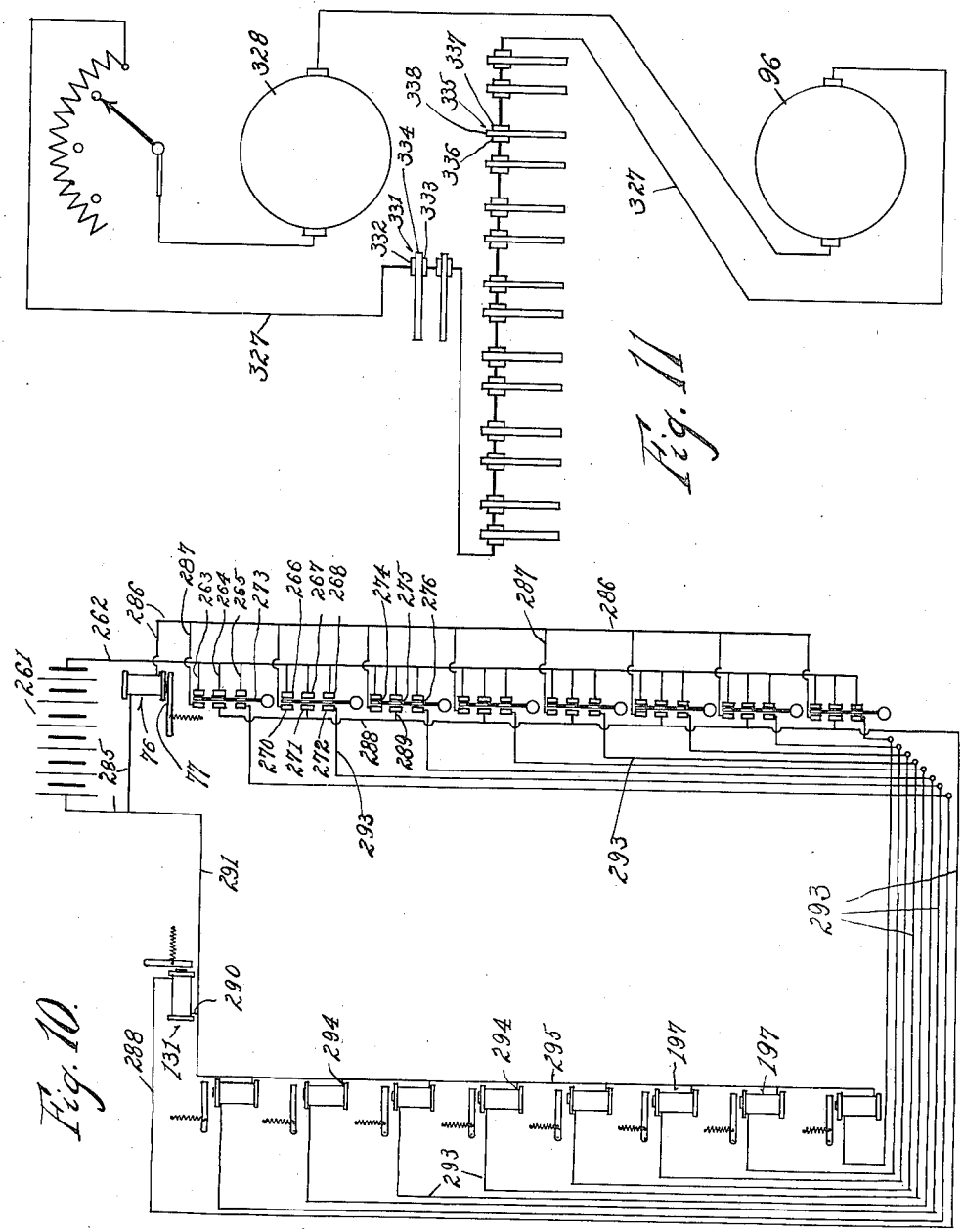

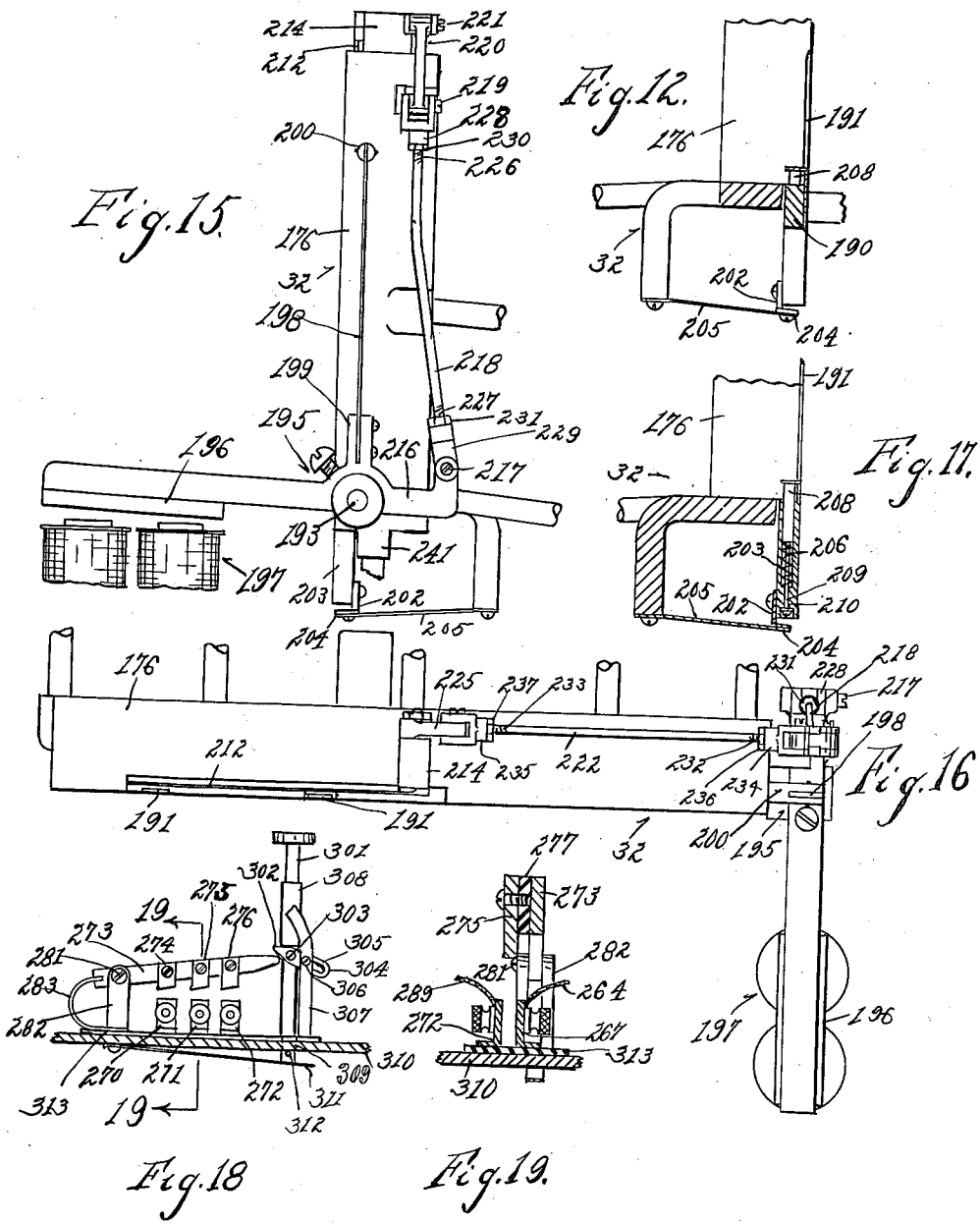

MAXIMILIAN GEO. VOIGTLANDER, OF COLUMBIA TOWNSHIP, HAMILTON COUNTY, OHIO, ASSIGNOR OF ONE-THIRD TO FRED A. FISCHER AND ONE-THIRD TO JOHN J. CRAIG, BOTH OF COVINGTON, KENTUCKY.

MAIL-DISTRIBUTING DEVICE.

1,293,259.         Specification of Letters Patent.         Patented Feb. 4, 1919.

Application filed July 5, 1917. Serial No. 178,833.

*To all whom it may concern:*

Be it known that I, MAXIMILIAN G. VOIGTLANDER, a citizen of the United States, residing at Columbia township, Hamilton county, Ohio, have invented certain new and useful Improvements in Mail-Distributing Devices, of which the following is a specification.

It is the object of my invention to provide a distributing device suitable for distributing mail, by means whereby the pieces of mail distributed are moved to predetermined positions according to the geographical points for which distribution is to be made; further, to provide novel distributing means for the purposes intended; further, to provide novel controlling means for controlling the distribution; further, to provide novel means for initiating the movements of the pieces of mail to be distributed and to control the direction and extent of the movements of the same; and, further, to provide novel means whereby when movement of a piece of mail is taking place the direction of its movement is controlled according to the predetermined manipulated control.

It is the object of my invention further to provide novel means for moving the pieces of mail to be distributed, and to provide novel means for controlling the directions of said movements; further, to provide novel means for shunting the pieces of mail out of a given normal direction of movement into another given direction of movement; and, further, to provide novel means for shunting the pieces of mail during movement in said last-named direction.

Further objects of my invention are to provide novel shutter mechanisms for controlling the distribution; and the invention will be further readily understood from the following description and claims, and from the drawings, in which latter:

Figure 1 is a front elevation of my improved device, part of the stations being broken away.

Fig. 2 is a plan view of the same.

Fig. 3 is a plan view of the motion initiating mechanism and gearing of the driving mechanism.

Fig. 4 is a front elevation of the same.

Fig. 5 is a bottom view of the same.

Fig. 6 is a vertical section taken on the line 6—6 of Fig. 1, and partly broken away, exemplifying the mail moving, shunting and receiving means.

Fig. 7 is a vertical section of the same, taken on the line 7—7 of Fig. 6, and showing one of the shunting stations and one of the receiving stations in front elevation, the channel for the shunting station and the chute for the receiving station being omitted.

Fig. 8 is a horizontal section taken on the line 8—8 of Fig. 6, showing a pair of the shunting stations, the right-hand station being shown closed, and the shunting shutter of the left-hand station being shown open for shunting the on-coming piece of mail.

Fig. 9 is a horizontal section taken on the line 9—9 of Fig. 6, showing a pair of the receiving stations, the right-hand receiving station being closed, and the shutter of the left-hand receiving station being open for receiving the on-coming piece of mail.

Fig. 10 is a diagrammatic representation of the electric connections for the selector mechanism.

Fig. 11 is a diagrammatic representation of the electric connections for interrupting the drive of the electric motor.

Fig. 12 is a detail of the tripping mechanism for the receiving shutter, shown in vertical section on the line 12—12 of Fig. 9.

Fig. 13 is a horizontal section taken on the line 13—13 of Fig. 6, showing the moving and tripping mechanism for the shunting shutter.

Fig. 14 is a detail of the shunting station, shown in vertical section, taken on the line 14—14 of Fig. 8.

Fig. 15 is a side elevation of the front end of the receiving station.

Fig. 16 is a plan view of the same.

Fig. 17 is a vertical sectional detail of the same taken on the line 17—17 of Fig. 9.

Fig. 18 is a detail in side elevation, showing one of the keys of the keyboard and the electric contacts controlled thereby.

Fig. 19 is a cross-section of the same taken on the line 19—19 of Fig. 18.

Fig. 20 is a cross-sectional detail of the electric breaking means for the belt-tightener pulleys, taken on the line 20—20 of Fig. 6.

Explaining the use for which the present exemplification of my invention is employed, it may be stated that in the present post office practice it is the custom to manually distribute the mail as it comes from the canceling machine by what is termed a primary distribution, that is to say, a distribution which will distribute the mail to the individual principal States, the principal cities, or other principal points, and to manually redistribute the mail of the various primary divisions, which latter usually takes place on the mail-cars or at the points of destination.

To illustrate this practice of a primary distribution of mail, and the application of the present exemplification of my invention thereto, it may be instanced that this primary distribution shall be to fifty-six destinations, one for each of the forty-eight States, one for Territories, one for foreign mail, one for city mail, one for undecipherable mail, and four for principal cities or other points. The present exemplification of my invention instances fifty-six points of destination, exemplified by the fifty-six keys of the key-board, although but sixteen of the destination stations are shown, the balance being broken away. It is obvious that the number of points of destination as well as their arrangement may be changed without departing from the spirit of my invention.

The present exemplification of my invention contemplates a manually operated electric control of the distribution, hereinafter termed a selector mechanism, including a key-board; further, means for initiating movement of the separate pieces of mail; further, shunting means for shunting the several pieces of mail out of their initial direction of movement; and further, arresting or shunting means for arresting or shunting the pieces of mail while in their secondary direction of movement for delivering the pieces of mail selectively to selective destination-stations.

I have further exemplified my invention as employing electric means for communicating control from the key devices to the distributing mechanisms.

In general arrangement, the present exemplification of my improved device comprises a series of laterally arranged direction-controlling or shunting stations 31, and a series of superposed receiving stations 32 for each of the shunting stations, the respective series of receiving stations and their respective shunting stations being arranged columnwise side by side, although, in a device having but a few receiving stations, the shunting stations may be employed as receiving stations, the receiving stations co-acting with the shunting stations being dispensed with.

Description of one of the shunting stations and one of the receiving stations will suffice for all of the shunting stations and receiving stations, respectively, as they are respectively duplicates of each other and preferably respectively interchangeable.

The device comprises a main frame 34, to which shunting frames 35 are preferably releasably attached, (see Figs. 6, 7 and 14), as by providing the main frame with a pair of parts 36, 37, the part 36 being provided with apertures 38 for receiving pins 39 on the shunting frame, and the part 37 being provided with pins 40 over which apertures 41 in the shunting frame are received, so that the shunting frame with the operative parts mounted thereon may be readily inserted at the shunting station, or removed therefrom, preferably at the rear of the device, so that if an accident should befall a given shunting device or the same should for any reason not operate properly, the same may be removed and substituted by another shunting device.

The shunting device comprises a shunting shutter 45. (See Figs. 7 and 8). The shutter is pivoted at one end thereof to the shunting frame, by means of pivots 46, shown as screws, the conical ends whereof are received in recesses 47 in the hub 48 of the shutter for adjusting the pivots and insuring ease of movement of the shutter, jam-nuts 49 clamping the pivot-pins in adjusted positions. Fingers 51 extend from the hub 48. The forward ends of the fingers are received in recesses 52 in the forward walls of the shunting frame, so that when the shutter is closed, pieces of mail readily pass the shutter without obstruction thereby.

The pieces of mail are instanced as moving in the direction of the arrow $a$ (Fig. 2), toward the shunting stations, and are arranged to follow one another. The respective pieces of mail travel consecutively.

The mail, preferably as it comes from the canceling machine, is received in a receptacle 55, (see Figs. 1, 2, 3 and 4), and is instanced as set on edge, one piece of mail in rear of the other, and normally pressed toward the delivering end of the receptacle, as by means of a slide 56 slidable on rods 57 which form the bottom of the receptacle and are urged toward the delivering end by means of a weight 58 on a flexible connection 59 received over a directing pulley 60 and attached to the slide.

Each piece of mail as it arrives at the delivering end of the receptacle has its address exposed by the exposure-opening 61, preferably covered by a transparent plate 62 as of glass, and has a quick thrust movement or impulse imparted thereto by the operator, whose position is at the key-board 63 of the selector mechanism, hereinafter described, the keys of the keyboard controlling the initiation of travel, direction of travel and destination of the respective pieces of mail.

The initiation of travel of the piece of mail 64 whose address is exposed at the exposure-opening in front of the operator, is caused by a motion-initiating roller 65. The roller 65 preferably has knobs thereon, for instance of rubber or other material making ready frictional contact with the piece of mail exposed for delivery, for imparting the desired quick motion or impulse thereto.

Roller 65 normally moves in the direction of the arrow $b$, (Fig. 3). A retarding roller 66 is provided. The rollers 65 and 66 are placed at opposite sides of the path of the mail, and the mail-contacting portions of their peripheries presented toward the mail, during contact with the mail, move in opposite directions. The roller 65 is arranged to retard all other than the one piece of mail at the forward end of the stack of mail contacted by the roller 65 and intended at the moment for delivery. The retarding roller acts to push back into the receptacle any piece of mail which has a tendency to adhere to or move with the one piece of mail being delivered. The piece of mail being delivered is next preferably engaged by a follow-up feeding roller 67, which rotates in the same direction as the roller 65 and preferably engages the piece of mail prior to release thereof by the roller 66 for continuing the thrust movement of the same toward the conveyer. The rollers preferably continuously rotate.

The roller 65 is fixed on a shaft 68 rotated in a bearing 69 of an arm 70, pivoted about a depending bearing-sleeve 71 of a bracket-frame 72, fixed to the main frame of the machine. A spring 73, the respective ends of which are secured to the arm 70 and to the bracket-frame, normally resiliently urges the roller 65 away from contact with the mail.

As soon as the operator observes the destination for the piece of exposed mail, he presses that one of the keys 74 of the keyboard corresponding to the destination-station of the device which corresponds with the destination of the address on the piece of mail. The operation of the key preferably has a triple effect, namely a movement of the roller 65 toward the piece of mail for initiating its movement, an opening of one of the shunting shutters 45, and an opening of one of the receiving shutters, the movements of these parts being preferably caused by electrical means brought into action by means to be presently described.

The depression of the key energizes an electro-magnet 76, the coil or coils of which are preferably fixed to the bracket-frame and the armature 77 of which is preferably fixed to the arm 70, so that when the key is operated the armature is momentarily attracted toward the coils and the motion initiating roller 65 momentarily makes contact with the inner or exposed piece of mail for initiating its movement with a sharp thrust.

A conveyer, instanced as comprising a pair of belts 80, travels laterally for aiding in carrying the pieces of mail to the selective one of said stations for which the piece of mail is intended.

The belts are caused to move by being received about pulleys 81, 82, at the respective ends of the loop thereof. The pulley 82 rotates about a stud-shaft 83 fixed in a bearing 84 of the frame of the machine. The pulley 81 is fixed to an upright shaft 85. The shaft 85 rotates in a bearing 86 of the bracket-frame and has a bevel gear 87 secured thereto. (See Figs. 1, 2, 3, 4, 5 and 6). A bevel pinion 88 meshes with the bevel gear and is fixed to a shaft 89 journaled in bearings 90, 91, and has a gear 92 fixed thereto. A drive-shaft 93 is suitably driven, as by means of a pulley 94 thereon, receiving a suitable belt from a usual electric motor which may be suitably supported on the frame of the machine, instanced by the belt 95 and the electric motor 96. The drive-shaft has a gear 97 thereon which meshes with a transmitting gear 98 meshing with the gear 92.

The feeding roller 67 is fixed to a shaft 101 journaled in the bearing sleeve 71. A gear 102 is fixed to the pulley-shaft 85 and meshes with a transmitting gear 103 which meshes with a gear 104 on the shaft 101, the latter gear meshing with a transmitting gear 105 which meshes with a gear 106 on the shaft 68 for rotating the motion-initiating roller 65. The retarding roller 66 is rotated by a train of gears 107, 108, 109, 110, the gear 107 meshing with the gear 104, and the gear 110 fixed to shaft 111 to which the retarding roller is secured.

The pieces of mail are arranged to move in a channel 115, instanced as having a bottom 116, and side-walls 117, 118, the side-wall 117 being interrupted at each of the shunting stations, so that the piece of mail may be received at the shunting station when the shunting shutter is open. The side-wall 118 is preferably extended upwardly for forming a backing support for the propelling stretch of the endless belt. The side-wall 117 is at the receiving end of the channel provided with a rearward extension 119, forming a wall for the receptacle 55. The rollers 65, 66, 67, project through slots in the respective side-walls, as see slot 120 for the roller 65.

For further aiding in moving the piece of mail along the series of shunting stations, rollers 121, instanced as idler rollers, are provided between the shunting stations. (See Figs. 2 and 8). Each of the idler rollers is shown mounted on a shaft 122 in a lever 123 pivoted at 124 to the shunting frame and spring-pressed toward the belt by a spring 125 located between the heel 126 of the lever and the shunting frame, so as to contact the pieces of mail and urge the same toward the conveyer belts.

The controlling device for the shunting shutter is exemplified as an electro-magnet 131, the coils of which are mounted on a bracket 132 of the shunting frame 35. (See Figs. 2, 6, 8, 13 and 14). The armature 133 of the electro-magnet is fixed to an arm 134 extending from the hub of the shunting shutter. The electro-magnet, when energized by the selective key of the keyboard, draws the armature toward it for opening the shunting shutter 45, the free ends of the fingers moving to a position in line with or past the plane of the mail-contacting face of the belts 80. In order to maintain the shunting shutter in shunting position until the piece of mail has been shunted thereby, I provide a catch 135 coacting with a keeper 136. The catch is on the tail-piece 137 of the shunting shutter, the catch being spring-pressed toward the keeper by being mounted on a leaf-spring 138 extending from a bracket 139 on the shunting frame 35.

The arm 134 and the armature thereon are spring-pressed by a spring 140 away from the coils of the magnet for normally closing the shunting shutter. The respective ends of the spring 140 are attached to the arm 134 and to an adjusting screw 141 adjustable in the bracket 139 and clamped in adjusted positions by adjusting nuts 142.

When the piece of mail in its travel contacts open shunting shutter 45, it is shunted into the shunting compartment, in which it is received on a shelf 145, which has an upwardly receding flange 146 and is supported at its back by a plate 147 and fingers 148 respectively secured to the shunting frame. (See Figs. 7, 8, 13 and 14). The momentum of the piece of mail causes it to strike a tripper 149, shown as a plate at the far end of the path of the piece of mail. This plate has a shank 150 which is longitudinally slidable in a bore 151 in the tail-piece 137 and is arranged to make contact with the catch 135 for releasing it from the keeper 136, whereby the shunting shutter is caused to snap shut through the action of the spring 140. The tripper is resiliently retracted by a spring 144.

The shelf 145 is fixed to arms 152 fixed to a rock-shaft 153 journaled in bearings 154 of the shunting frame, and having an arm 155 fixed thereon, which, by means of a link 156 articulated thereto at 157 and articulated at 158 with an arm 159 fixed on the tail-piece 137, is arranged to be moved by said tail-piece.

This operation is such that when the shunting shutter is opened by the operation of the selector mechanism, the shelf 145 moves toward the bottom 116 of the channel 115 for momentarily supporting the shunted piece of mail. The momentum of the shunted piece of mail carries it against the tripper 149, thereby tripping the catch 135 and closing the shutter. The act of closing the shutter, through the medium of the link 156 and its connecting mechanism with the rock-shaft 153, causes the shelf 145 to move away from the bottom 116, forming an opening 160 between said shelf and bottom, through which the shunted piece of mail drops for being conveyed into that selective one of the receiving stations thereunder which has been set up by manipulation of the selector mechanism for receiving the same.

As the piece of mail so released drops, it is carried to a selective one of the receiving stations 32, along a chute 164, there being a plurality of these chutes arranged laterally, for instance, one for each of the shunting stations. (See Figs. 1, 2 and 6.) For facilitating movement of the piece of mail, each of the chutes is provided with a conveyer, instanced as a pair of belts 165 received loopwise about pulleys 166, 167, the mail-contacting stretches of said belts moving downwardly lengthwise of the series of receiving shutters. The belts are suitably operated, as by shafts 168, 169, journaled in bearings 170, 171, in the frame, and having the pulleys 166, 167, thereon, about which the belts travel, the pulleys 166 being fixed to the shaft 168. The shaft 168 has a gear 172 fixed thereon, which meshes with the gear 97 fixed to the drive-shaft.

Each of the receiving stations is provided with a receiving frame 176 which is preferably releasable for the substitution of another frame. The receiving frame comprises a receiving rack 177 in which the received mail is stacked. (See Figs. 1, 2, 6 and 9.) A follower 178 is slidable on the rods of the rack, being held to the rods preferably by means of bearings 179 at the base of the follower. The bearings 179 are held to the rods preferably with sufficient friction to prevent undesirable retraction of the follower but permitting the follower to be pushed rearwardly by the incoming mail. The follower comprises a gate 180 pivoted to the base on pivots 181 and normally held in raised position by a brace 182 pivoted to the gate at 183 and slidable in a slot 184 of the follower, being held in raised position by means of a catch 185. The release of the catch will permit the dropping of the gate for ready removal of the mail in the rack.

The rack preferably slants downwardly so that the mail will naturally arrange itself by gravity against the gate and tend to move away from the receiving shutter 186. The receiving shutter is normally closed. It comprises a hub 190 to which fingers 191 are secured. (See Figs. 7, 9, 12, 15, 16 and 17.) The fingers are normally received in recesses 192 in the receiving frame and are normally out of obstructing relation with the traveling mail.

The hub has trunnions 193 journaled in bearings 194 in the receiving frame and has a lever 195 secured thereto, on one arm of which is fixed the armature 196 of an electro-magnet 197. The armature is normally retracted from the coil or coils of the magnet and the fingers normally laid in unobstructing position by means of a spring 198 shown as a leaf-spring secured to an arm 199 of the armature lever and held in a lug 200 on the receiving frame. The coils of the electromagnet are supported on brackets 201 extending from the main frame of the machine. When the electromagnet 197 is energized by manipulation of one of the keys of the keyboard, the armature is drawn toward the coil thereof for moving the fingers, so that their swinging ends are received within or past the plane of the mail-contacting faces of the feeding stretches of the traveling belts 165, whereby the fingers are moved into obstructing position in order that the piece of mail intended for the receiving station, the fingers of which have thus been controlled, shall be received at said receiving station for being delivered thereto. The shutter of which the fingers are a part is held in obstructing relation by means of a catch 202 located on a tail-piece 203 of the shutter and arranged to coact with a keeper 204 spring-pressed toward the catch by being mounted on a leaf-spring 205 secured to a frame of the receiving station.

When the piece of mail is received in the receiving compartment behind the receiving shutter, its momentum carries it against a tripper 208 provided with a shank 209 slidable lengthwise in a bore 210 in the tail-piece 203, and contacting the keeper 204 for releasing the catch, whereby the shutter is returned to normal position. The tripper is resiliently retracted by a spring 206.

In order that the incoming mail may have free passage behind the receiving shutter, unobstructed by the previously received mail, I provide a temporary support or retaining piece 212, shown as a finger, secured to a rocker-rod 213, journaled in a bearing 214 in the frame 176. (See Figs. 6, 7, 15 and 16.) The finger is normally out of obstructing relation with the received mail. When, however, the receiving shutter is actuated for receiving a piece of mail, the finger is brought into obstructing relation in front of the mail previously received, for holding the same away from the shutter and insuring a receiving space between the finger and the shutter, when the latter is open. The retaining piece is preferably controlled by coaction with the receiving shutter, instanced as accomplished by providing the armature lever with an arm 216 articulated at 217 with a link 218 in turn articulated at 219 with a bell-crank lever 220. (See Figs. 7, 15 and 16.)

The bell-crank lever is pivoted at 221 with the frame 176. A link 222 is articulated at 223 with the bell-crank lever and at 224 with an arm 225 secured to the rocker-rod 213.

The link 218 is preferably adjustable in length by means of threaded connections 226, 227, with the bearing pieces 228, 229, of the articulations thereof, the link being held in adjusted positions by means of jam-nuts 230, 231, and the link 222 is preferably adjustable in length by means of the threaded connections 232, 233, with the bearing pieces 234, 235, of the articulations thereof, the link being held in adjusted position by jam-nuts 236, 237.

The respective receiving frames and the parts mounted thereon are preferably removable and interchangeable. They are respectively provided with seating lugs 241, 242, received in seating recesses 243, 244, on brackets 245, 246, extending from uprights 247, 248, in the main frame of the machine for positioning the receiving frame. The receiving station together with the armature thereon is removable rearwardly from the main frame and another receiving station is arranged to be substituted, so that if any mishap occurs to any receiving station, or any part thereof is out of order, the receiving station may be instantly replaced.

In order to aid the traveling of the mail toward the receiving stations, suitable idler rollers 251 are provided. (See Figs. 6 and 7.) A pair of idler rollers coact with each pair of belts, preferably between each pair of superposed receiving stations. The pair of idler rollers is mounted on a shaft 252 journaled in bearings 253 of levers 254 pivoted at 255 to the receiving frame, springs 256 between the heels 257 of said levers and the receiving frame urging the rollers resiliently toward the belts.

In the present exemplification of my invention, I provide a series of shunting stations arranged side by side, and series of receiving stations arranged columnwise with relation to the shunting stations, and electric controlled means at the respective stations, so that the course and destination of each piece of mail may be determined prior to the initiation of its movement. I prefer to control the means for initiating movement of the piece of mail, the shunting shutter for determining the course of that piece of mail, and the receiving shutter for determining its destination, by means of a single key, and preferably by electrically controlled means.

I have instanced the keyboard of the selector mechanism at 63 having a number of keys corresponding to the number of receiving or destination stations, the keys being arranged in columns 258 corresponding with the columns of shutters. (See Figs. 1 and 2.) Each key is arranged for electric connection for moving the motion-initiating roller 65. All the keys of each column are arranged for electric connection for energizing the controlled means for the shunting shutter corresponding with a given column of keys, and each key in each column is arranged for energizing the electric means for actuating a given receiving shutter corresponding therewith. In this exemplification, therefore, I provide three electric contacts for each key, one controlling the motion-initiating or propulsion roller, one controlling a shunting shutter, and one controlling a receiving shutter.

Thus referring to Fig. 10, I have exemplified a diagrammatic representation of the electric connections for a given column of keys, the other columns being duplicates of the exemplified column, and in Figs. 18 and 19 I have exemplified a desirable form of electric contact means with which each key is provided.

261 represents a battery with which the leads for all the keys are connected. An electric conductor 262 leads from one of the poles of the battery and has branches 263, 264, 265, electrically connected with contacts 266, 267, 268, for each of the keys. Coacting contacts 270, 271 and 272 are provided for the contacts 266, 267, 268. An arm 273 has thereon electric contacts 274, 275, 276, arranged to bridge the contacts respectively 266—270, 267—271, 268—272. The contacts 274, 275 and 276 are located on the arm 273 but insulated therefrom and from each other by insulation 277.

The arm 273 is pivoted at 281 to a lug 282 of the frame of the keyboard, a spring 283 normally raising the arm so that the contacts thereon are normally out of contact with their respective coacting contacts.

An electric conductor 285 leads from the other pole of the battery to one of the binders of the coil of the electro-magnet 76 which controls the armature 77 for the selector roll initiating movement of the mail. An electric conductor 286 connects with the other binding post of this electro-magnet and has branches 287 leading to and electrically connected with each of the electric contacts 270, so that said electro-magnet is energized by closing the gap between the contacts 266, 270, by means of the electric contact 274 on each of the arms 273, so that said roller is moved toward the mail at each actuation of any key of the keyboard.

An electric conductor 288 is provided with branches 289 which respectively electrically connect with each of the respective contacts 271. The electric conductor 288 leads to one of the binding posts of the electro-magnet 131 which controls the position of the shunting shutter of the column. An electric conductor 290 connects with the other binding post of said electro-magnet and with a return electric conductor 291, which leads to the electric conductor 285 and the other pole of the battery.

When now the gap between any pair of electric contacts 267—271 in the given column is bridged by the contact 275 by manipulation of any key in said column, the shunting shutter of said given column is opened.

Electric conductors 293 connect respectively with the respective contacts 272 and with one of the binding posts of the respective electro-magnets 197 of the receiving shutters. For instance, the contact 272 of the upper key of a given column of keys connects with the electro-magnet of the upper receiving shutter for that given column, and the contact 272 of the lowest key of a given column connects with the electro-magnet for the lowest receiving shutter of that given column, intermediate contacts and electro-magnets being correspondingly arranged. The other binding post of each of said electro-magnets has an electric conductor 294 leading therefrom, which is connected with an electric conductor 295 leading to the electric conductors 291, 285, and the other pole of the battery. If now any given key-actuated lever is depressed, the electric contact 276 thereon will bridge the gap between the electric contacts 268, 272, for that given key, and the corresponding receiving shutter will be opened.

The receiving shutter and the shunting shutter for a given piece of mail is preferably arranged for receiving the same prior to the actuation of that piece of mail, to accomplish which the contact 276 is preferably brought in contact with the contacts 268—272 and the contact 275 is preferably brought into contact with the contacts 267—271, prior to contact of the contact 274 with the contacts 266, 270, as exemplified in the side elevation of these contacts shown in Fig. 18. The contact of the contact 274 with the contacts 266—270 is preferably only momentary for causing operation of the motion-initiating roller 65 on the piece of mail only sufficiently long to initiate movement of said piece of mail sufficiently to cause its being received by the next motion imparting means.

For aiding in this result, I provide the key-bar 301 with an operating finger 302 pivoted to the key-bar at 303 and arranged to contact the end of the switch-arm 273 and move the latter for a given distance, whereupon the finger drops away from the switch-arm for causing retraction of the arm by means of the spring 283. In order to give a wide range of movement to the arm, I have provided the finger with an extension 304 having a slot 305 therein, a pin 306 being received in the slot and controlling the direction and movement of the finger. The pin 306 is in an upright 307 which carries a bearing 308 for the key-bar.

The key-bar is received through an aperture 309 in a supporting plate 310 of the keyboard mechanism, and is normally retracted by a spring 311, a pin 312 limiting retractive movement of the key-bar. The contacts 266, 267, 268, and 270, 271 and 272, are insulated from the supporting plate by a sheet of insulation 313.

Means are provided for automatically stopping the mechanism, if there should be a failure in the driving means. Thus each of the belts 80 is provided with a tightener pulley 316, and each of the belts 165 is provided with a tightener-pulley 317. (See Figs. 1 and 2.) Each of the tightener pulleys is connected with an electric switch for interrupting current to the motor 96 if any belt should break or become too loose. Description of one of these switches will suffice for all.

Referring to Figs. 6 and 20 it will be noted that the tightener pulley 317 is journaled in a bell-crank lever 321 pivoted at 322 to the main frame of the machine. A spring 323, the respective ends of which connect with the bell-crank lever and the main frame of the machine, normally urges the tightener pulley toward the belt for stretching the same. The spring may be adjusted by having one of its ends received in an adjusting screw 324, and adjusting nut 325 coacting therewith. The bell-crank lever has an electric contact thereon insulated therefrom by insulation 326, the electric contact normally closing a gap in the feed wire 327 for the electric motor. If however the belt should break or become unduly stretched, the electric contact will leave said gap, and interrupt the electric current to the driving motor for stopping the same. All of said gaps are arranged in series in the feed wire for the electric motor, so that if any gap at any point should be created, the electric motor will stop, thereby giving notice of the difficulty and causing correction of the difficulty before operation can be resumed.

The arrangement is illustrated diagrammatically in Fig. 11 in which a generator 328 is instanced as supplying the electromotive force for the motor 96. The feed-wire 327 is provided with gaps 331 having terminal contacts 332, 333, arranged to be bridged by the contacts 334, assumed as coacting with the respective tightener-pulleys 316. The feed-wire is also provided with gaps 335 having terminal contacts 336, 337, arranged to be bridged by the contacts 338 assumed as coacting with the respective tightener-pulleys 317.

I do not herein claim the feeding in means for the mail herein shown and described, as the same are shown, described and claimed in an application divisional hereof, filed by me May 18, 1918, Serial No. 235,379.

Having thus fully described my invention, what I claim as new and desire to secure by Letters Patent, is:

1. In a mail distributing device, the combination of controlling means for controlling the movement of the pieces of mail to be distributed, electric means under the control of the operator for controlling the controlling arrangement of said controlling means, and means acted on by the pieces of mail for returning said controlling means to normal position.

2. In a mail distributing device, the combination of controlling means for controlling the movement, in a plurality of directions, of the pieces of mail to be distributed, electric means under the control of the operator for controlling the controlling arrangement of said controlling means, and means acted on by the pieces of mail for returning said controlling means to normal position.

3. In a mail distributing device, the combination of controlling means for controlling the movement of the pieces of mail in a given direction and in a plurality of paths extending directionally different from said given direction, electric means under the control of the operator for controlling the controlling arrangement of said controlling means, and means acted on by the pieces of mail for returning said controlling means to normal position.

4. In a mail distributing mechanism, the combination of a series of laterally arranged diverting shutters, a series of receiving shutters arranged columnwise with relation to said respective diverting shutters, means causing movement of the pieces of mail to be distributed, means under the control of the operator causing selective diverting position of said diverting shutters and selective receiving position of said receiving shutters, and means arranged to be controlled by the pieces of mail being distributed for causing return of said shutters to normal positions.

5. In a mail distributing mechanism, the combination of receiving compartments, shutters therefor, means causing movement toward said receiving compartments of the pieces of mail to be delivered, means under the control of the operator causing selective positioning of said shutters, and means acted on by the pieces of mail automatically returning said shutters to normal positions.

6. In a mail distributing mechanism, the combination of receiving stations, means causing movement of the pieces of mail to be distributed toward said receiving stations, diverting means under the control of the operator causing selective receiving of pieces of mail at selective ones of said receiving stations, and means moved by contact by the piece of mail delivered for returning said diverting means to normal relation.

7. In a mail distributing mechanism, the combination of a mail receptacle, a mail channel connecting therewith, a mail projecting means acting to project the pieces of mail successively into said channel, a mail retarding means in a wall of said channel for retarding pieces of mail free of mail-projecting contact, mail compartments arranged lengthwise of said channel, a mail conveying belt moving crosswise of the mouths of said compartments, and rollers coacting with said belt between said compartments for conveying the pieces of mail.

8. In a mail distributing mechanism, the combination of a mail receptacle, a mail channel connecting therewith, a mail projecting means acting to project the pieces of mail successively into said channel, a mail retarding means in a wall of said channel for retarding pieces of mail free of mail-projecting contact, mail compartments arranged lengthwise of said channel, a mail conveying belt moving crosswise of the mouths of said compartments, rollers coacting with said belt between said compartments for conveying the pieces of mail, and resilient means for normally urging said rollers toward said belt.

9. In a mail distributing mechanism, the combination of a mail receptacle, a mail channel connecting therewith, a mail projecting means acting to project the pieces of mail successively into said channel, a mail retarding means in a wall of said channel for retarding pieces of mail free of mail-projecting contact, mail compartments arranged lengthwise of said channel, a mail conveying belt moving crosswise of the mouths of said compartments, rollers coacting with said belt between said compartments for conveying the pieces of mail, shutters for said respective compartments, means for selectively moving said shutters across the path of movement of said mail, and means contacted by the piece of mail arranged to cause return of said shutters to normal positions 10. In a mail distributing mechanism, the combination of mail conveying means, mail stations respectively comprising shutters, means causing selective movement of said shutters to mail-directing position, said mail stations respectively comprising a mail-support coacting with said shutter, means holding said shutter in directing position, and a trip arranged to be actuated by the directed mail for tripping said holding means for return of said shutter and support to normal positions.

11. In a mail distributing mechanism, the combination of mail conveying means, mail compartments respectively comprising a shutter and a movable mail support coacting therewith, and means causing selective movement of said shutters and said movable mail support to main-coacting position.

12. In a mail distributing mechanism, the combination of mail conveying means, mail compartments respectively comprising a shutter and a mail support coacting therewith, means causing selective movement of said shutters to mail-coacting position, and automatic means at said respective compartments for returning said shutter and mail support to normal positions.

13. In a mail distributing mechanism, the combination of mail conveying means, mail stations respectively comprising a shutter, electrically controlled means for movement of said shutter crosswise of the path of the mail, selector mechanism comprising keys respectively controlling said movements, means holding said shutter in actuated position, and means contacted by the piece of mail causing release of said last-named means for return of said shutter to normal position.

14. In a mail distributing mechanism, the combination of mail moving means, diverting stations comprising a diverting shutter, and means at said respective stations comprising electric means causing movement of the diverting shutter, latching means retaining said diverting shutter in abnormal position, and a part contacted by the incoming piece of mail releasing said latching means for return of said shutter to normal position.

15. In a mail distributing mechanism, the combination of mail moving means, mail stations across which the mail is moved, said stations respectively comprising a shutter, an electric translating device arranged for movement of said shutter into mail contacting position, a latch holding said shutter in said last-named position, means coacting with said shutter for holding the incoming piece of mail in upright relation, and a part acting on said latch for automatically releasing said shutter by contact by said incoming piece of mail with said part.

16. In a mail distributing mechanism, the combination of mail moving means, mail stations across which the mail is moved, said mail stations respectively comprising a shutter, an electric translating device arranged for movement of said shutter, means holding said shutter in moved position, a part acting on said holding means for automatically releasing said shutter by the incoming piece of mail, selector mechanism comprising keys for said respective stations, and electric control connections for said translating devices whereby upon actuation of a given key a given one of said translating devices is electrically controlled for selective movement of said shutters.

17. In a mail distributing mechanism, the combination of mail conveying means and mail shunting stations respectively comprising a shunting shutter, a mail support, and means acting by contact of the piece of mail therewith to return said shunting shutter to normal position and said mail support to retracted position for passage of the piece of mail past said support.

18. In a mail distributing mechanism, the combination of mail moving means and shunting stations for shunting the course of movement of the mail, said shunting stations respectively comprising a shunting shutter, electric means for movement of said shunting shutter across the path of the mail, a bottom for momentarily supporting the piece of mail shunted by said shunting shutter, adjustable means causing coaction between said bottom and said shunting shutter, means for momentarily holding said shunting shutter and said bottom in actuated relation, and means arranged to be contacted by the incoming piece of mail for causing return of said shunting shutter and said bottom to normal positions.

19. In a mail distributing mechanism, the combination of mail moving means and shunting stations for shunting the course of movement of the mail, said shunting stations respectively comprising a shunting shutter, electric means for movement of said shunting shutter across the path of the mail, means coacting with said shunting shutter for maintaining the shunted piece of mail in upright position, a bottom between said last-named means and said shunting shutter for momentarily supporting the piece of mail shunted by said shunting shutter, means causing coaction between said bottom and said shunting shutter, means for momentarily holding said shunting shutter and said bottom in actuated relation, and means arranged to be contacted by the incoming piece of mail for causing return of said shunting shutter and said bottom to normal positions.

20. In a mail distributing mechanism, the combination of mail moving means, shunting stations across which the mail is moved, said shunting stations respectively comprising a shunting shutter, an electric translating device arranged for movement of said shunting shutter into shunted position, a latch holding said shunting shutter in shunted position, means coacting with said shutter for holding the incoming piece of mail in upright relation, and a part acting on said latching means for automatically releasing said shunting shutter by contact by said incoming piece of mail with said part.

21. In a mail distributing mechanism, the combination of mail moving means, shunting stations across which the mail is moved, said shunting stations respectively comprising a shunting shutter, an electric translating device arranged for movement of said shunting shutter into shunted position, a latch holding said shunting shutter in shunted position, means coacting with said shutter for holding the incoming piece of mail in upright relation, a part acting on said latch for automatically releasing said shunting shutter by contact by said incoming piece of mail with said part, selector mechanism comprising keys for said respective shunting stations, and electric control connections for said electric translating devices whereby upon actuation of a given key a given one of said electric translating devices is electrically controlled for selective movement of the shutters.

22. In a mail distributing mechanism, the combination of mail moving means, shunting stations across which the mail is moved, said shunting stations respectively comprising a shunting shutter, an electric translating device arranged for movement of said shunting shutter into shunted position, a latch holding said shunting shutter in shunted position, means coacting with said shutter for holding the incoming pieces of mail in upright relation, a part acting on said latching means for automatically releasing said shunting shutter by contact by said incoming piece of mail with said part, a movable bottom for said shunting station, and means coacting with said shunting shutter momentarily closing said bottom upon opening of said shunting shutter.

23. In a mail distributing mechanism, the combination of mail moving means, shunting stations across which mail is moved by said mail moving means, said respective shunting stations comprising, a shunting shutter, spring means for normally closing said shunting shutter, an electric translating device, selector mechanism comprising keys having electric connection with said respective electric translating devices for controlling the latter, said shunting stations further comprising a movable bottom, connecting means between said shunting means and movable bottom for causing closing of said bottom upon opening of said shunting shutter, a latch for maintaining open relation of said shunting shutter, and a part having actuating connection with said latch for automatically releasing said latch upon contact therewith by an incoming piece of mail, whereby to return said shunting shutter to closed relation and said bottom to open relation for the passage of said piece of mail past said bottom.

24. In a mail distributing mechanism, the combination of a framing, a mail moving means, mail shunting stations crosswise of which said mail moving means are arranged to move the mail, said shunting stations respectively comprising a shunting frame, a shunting shutter, a movable bottom for the mail and electric actuating means for said shutter and bottom mounted on said shunting frame, and releasable connecting means between said respective shunting frames and said framing whereby said shunting frames are interchangeably received by said framing for supporting the same.

25. In a mail distributing mechanism, the combination of mail conveying means and mail receiving stations respectively comprising a receiving shutter arranged to be moved into receiving position, a mail support coacting therewith for forming a mail receiving space between said support and shutter, and means acting by contact of the piece of mail therewith to return said shutter to normal position and said mail support to retracted position for passage of the piece of mail past said support.

26. In a mail distributing mechanism, the combination of mail conveying means, mail receiving stations respectively comprising a receiving shutter, electrically controlled means for moving said receiving shutter crosswise of the path of the mail, selector mechanism comprising keys respectively controlling said actuatings, means holding said shutter in actuated position, and means contacted by the piece of mail received by the shutter causing release of said last-named means for return of said shutter to normal position.

27. In a mail distributing mechanism, the combination of mail conveying means, mail receiving stations respectively comprising a receiving shutter, electrically controlled means for moving said receiving shutter crosswise of the path of the mail, selector mechanism comprising keys respectively controlling said actuations, means holding said shutter in actuated position, means contacted by the piece of mail received by the shutter causing release of said last-named means for return of said shutter to normal position, a receiving rack, and an obstructing part between said shutter and receiving rack coacting with said shutter.

28. In a mail distributing mechanism, the combination of a framing, receiving stations respectively comprising a receiving frame and a diverting shutter, electric means comprising relatively movable parts one of which is mounted on said framing and one of which is mounted on said receiving frame, said last-named part and said diverting shutter movable with said receiving frame, and releasable connecting means between said receiving frame and said framing whereby said receiving frames are interchangeably connected with said framing at said receiving stations.

29. In a mail distributing mechanism, the combination of shunting stations arranged side by side, columns of receiving stations respectively under said shunting stations, mail conveying means extending crosswise of said shunting stations, mail conveying means for said columns under said last-named conveying means, said shunting stations respectively comprising shunting shutters and movable bottoms coacting therewith, and means for closing said shunting stations and opening said bottoms for transference of the mail from said shunting stations to said columns.

30. In a mail distributing mechanism, the combination of shunting stations arranged side by side, columns of receiving stations respectively under said shunting stations, channels extending crosswise of said shunting stations for serving the same, mail conveying means extending lengthwise of said channels, chutes extending up and down coacting with said respective columns of receiving stations, mail conveying means extending lengthwise of said chutes, said respective shunting stations comprising a shunting shutter and movable bottom coacting therewith, said receiving stations respectively comprising a diverting shutter, means for selective actuation of said shutters for receiving the mail, said shunting stations respectively comprising automatic means actuated by the incoming mail for closing the shutter and opening said bottom for transference of the received piece of mail into the chute thereunder and movement of said piece of mail to the diverted shutter in said column, and means actuated by the received piece of mail for closing said last-named shutter.

31. In a mail distributing mechanism, the combination of a series of shunting stations arranged side by side and comprising shunting shutters and movable bottoms, a series of receiving stations arranged columnwise under said respective shunting stations and comprising receiving shutters, a conveyer belt for conveying pieces of mail crosswise of said shunting stations, conveyer belts coacting with said respective columns of receiving stations for moving shunted pieces of mail along said respective columns, rollers between shunting stations and between receiving stations of said respective columns of receiving stations coacting with said respective belts for conveyance of said pieces of mail, and means causing selective movement of said shutters past the mail-contacting surfaces of said belts for diverting selective pieces of mail by said shunting shutters and receiving shutters.

32. In a mail distributing mechanism, the combination of a mail propulsion means, electric control means for causing coaction between said propulsion means and the pieces of mail, shunting shutters, electric control means therefor, receiving shutters, electric control means therefor, electric connections for said respective control means, keys, switches in said respective electric connections, and means having connection with said keys operating said switches in succession.

33. In a mail distributing mechanism, the combination of a mail propulsion device, electric control means therefor, a series of shunting shutters, electric control means for said respective shunting shutters, columns of receiving shutters coacting respectively with the shunting shutters of said series of shunting shutters, electric control means for said respective receiving shutters, electric connections for said respective control means, a selector comprising keys arranged in columns coinciding with said columns of receiving shutters, and switches in said respective electric connections, each of said keys having operative connection with a switch for said first-named electric control means, each of the keys of a given column having operative connection with a switch of the second-named electric control means, and the respective keys of a given column having operative connection with the respective switches of a corresponding column of said third-named control means.

In testimony whereof, I have hereunto signed my name in the presence of two subscribing witnesses.

MAXIMILIAN GEO. VOIGTLANDER.

Witnesses:
  THERESA M. SILBER,
  CHARLES E. WEBER.